(12) United States Patent
Byun et al.

(10) Patent No.: US 8,658,307 B2
(45) Date of Patent: Feb. 25, 2014

(54) RECHARGEABLE BATTERY

(75) Inventors: Sangwon Byun, Yongin-si (KR);
Chiyoung Lee, Yongin-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 273 days.

(21) Appl. No.: 13/137,195

(22) Filed: Jul. 27, 2011

(65) Prior Publication Data

US 2012/0094170 A1 Apr. 19, 2012

(30) Foreign Application Priority Data

Oct. 18, 2010 (KR) .......................... 10-2010-0101456

(51) Int. Cl.
*H01M 2/02* (2006.01)
*H01M 2/10* (2006.01)

(52) U.S. Cl.
USPC .......................................... 429/178; 429/186

(58) Field of Classification Search
None
See application file for complete search history.

(56) References Cited

U.S. PATENT DOCUMENTS

| | | |
|---|---|---|
| 2005/0221178 A1 | 10/2005 | Kim |
| 2005/0287429 A1* | 12/2005 | Cho et al. ...................... 429/161 |
| 2006/0068277 A1 | 3/2006 | Kim et al. |
| 2007/0009793 A1* | 1/2007 | Kim et al. ...................... 429/175 |
| 2007/0117011 A1* | 5/2007 | Myerberg et al. ............. 429/164 |
| 2010/0247989 A1 | 9/2010 | Kim |
| 2011/0039152 A1* | 2/2011 | Kim et al. ...................... 429/178 |
| 2011/0052963 A1* | 3/2011 | Lee et al. ....................... 429/148 |

FOREIGN PATENT DOCUMENTS

| | | |
|---|---|---|
| KR | 10-2005-0098318 A | 10/2005 |
| KR | 10-2005-0121907 A | 12/2005 |
| KR | 10-2006-0028063 A | 3/2006 |
| KR | 10-0637443 B1 | 10/2006 |
| KR | 10 2010-0108854 A | 10/2010 |

* cited by examiner

*Primary Examiner* — Patrick Ryan
*Assistant Examiner* — Jose Colucci Rios
(74) *Attorney, Agent, or Firm* — Lee & Morse, P.C.

(57) ABSTRACT

A rechargeable battery including an electrode assembly, the electrode assembly including a non-coating portion having a front surface, a rear surface, and a side surface; a case accommodating the electrode assembly; a cap plate sealing the case; and a collector electrically connected to the non-coating portion of the electrode assembly, wherein the collector includes a front collector tab welded to the front surface of the non-coating portion and a rear collector tab welded to the rear surface of the non-coating portion, a collector plate electrically connected to the collector tabs, the collector plate being coupled with a bottom surface of the cap plate, and a protrusion protruding perpendicularly from one of the front collector tab or rear collector tab.

8 Claims, 5 Drawing Sheets

RECHARGEABLE BATTERY

BACKGROUND

1. Field

Embodiments relate to a rechargeable battery.

2. Description of the Related Art

Generally, rechargeable batteries may be chargeable and dischargeable, unlike primary batteries, which are not chargeable. A low capacity battery, in which one battery cell is packaged into a pack shape, may be used as power sources for various portable small electronic devices, e.g., mobile phones, camcorders, etc. A high capacity battery, in which several tens or dozens of battery cells are connected to each other, may be used as power sources for driving motors, e.g., electric scooters, hybrid electric vehicles, electric vehicles, etc.

Rechargeable batteries may include an electrode assembly (including a positive electrode plate, a negative electrode plate, and a separator between the positive and negative electrode plates), a case accommodating the electrode assembly together with electrolyte, and a cap plate mounted on the case. A collector may be welded to a non-coating portion of the electrode assembly.

SUMMARY

Embodiments are directed to a rechargeable battery

The embodiments may be realized by providing a rechargeable battery including an electrode assembly, the electrode assembly including a non-coating portion having a front surface, a rear surface, and a side surface; a case accommodating the electrode assembly; a cap plate sealing the case; and a collector electrically connected to the non-coating portion of the electrode assembly, wherein the collector includes a front collector tab welded to the front surface of the non-coating portion and a rear collector tab welded to the rear surface of the non-coating portion, a collector plate electrically connected to the collector tabs, the collector plate being coupled with a bottom surface of the cap plate, and a protrusion protruding perpendicularly from one of the front collector tab or rear collector tab.

The front collector tab may have a first length, the rear collector tab may have a second length, and the first length may be different from the second length.

One of the first length and the second length may be greater than the other, and the protrusion may protrude from the collector tab with a greater length.

The protrusion may contact the side surface of the electrode assembly.\

The protrusion may have a length equal to or less than a thickness of the non-coating portion.

The collector may further include an electrode terminal, the electrode terminal being coupled to the collector plate.

The rechargeable battery may further include a second electrode assembly, the second electrode assembly including a non-coating portion having a front surface, a rear surface, and a side surface; and a pair of second collector tabs respectively welded to the front surface and the rear surface of the non-coating portion of the second electrode assembly, wherein a second protrusion protruding perpendicularly to each of the second collector tabs is on one of the pair of second collector tabs.

The pair of second collector tabs may be electrically connected to the collector plate.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
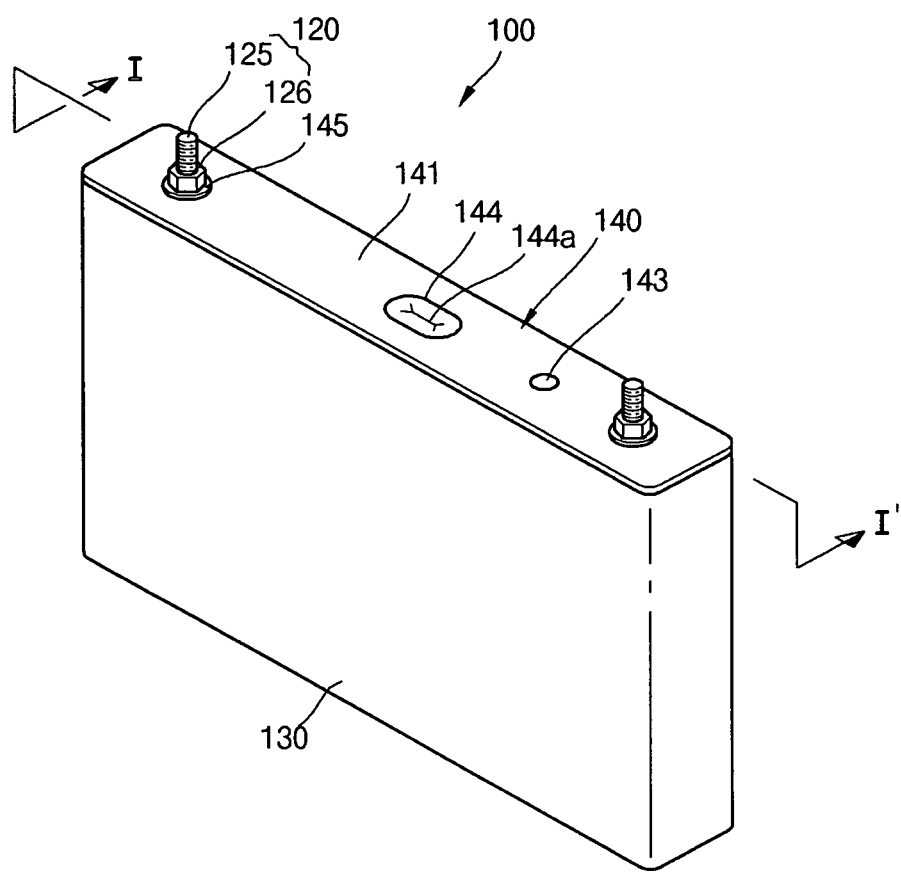
FIG. 1 illustrates a perspective view of a rechargeable battery according to an embodiment.

Korean Patent Application No. 10-2010-0101456 filed on Oct. 18, 2010, in the Korean Intellectual Property Office, and entitled: "Rechargeable Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, or one or more intervening elements may also be present. In addition, it will also be understood that when an element is referred to as being "between" two elements, it can be the only element between the two elements, or one or more intervening elements may also be present. Also, the terms "front" and "rear" are used herein in a relative sense only to convey a relationship between elements. That is, the terms are not terms of limitation and are not to be construed in an absolute sense. Like reference numerals refer to like elements throughout.

Figure 2:
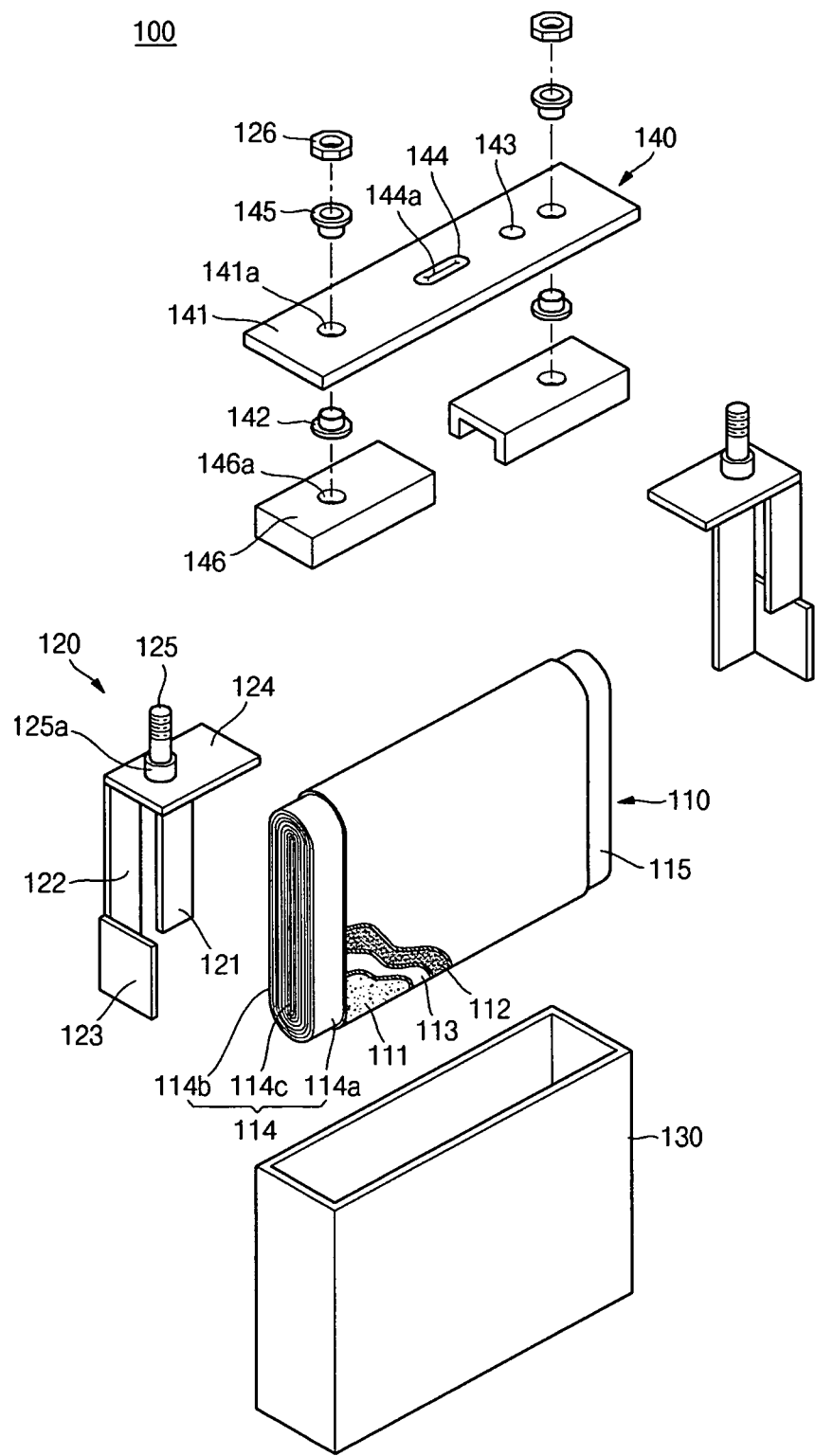
FIG. 2 illustrates an exploded perspective view of the rechargeable battery of FIG. 1.
Figure 3:
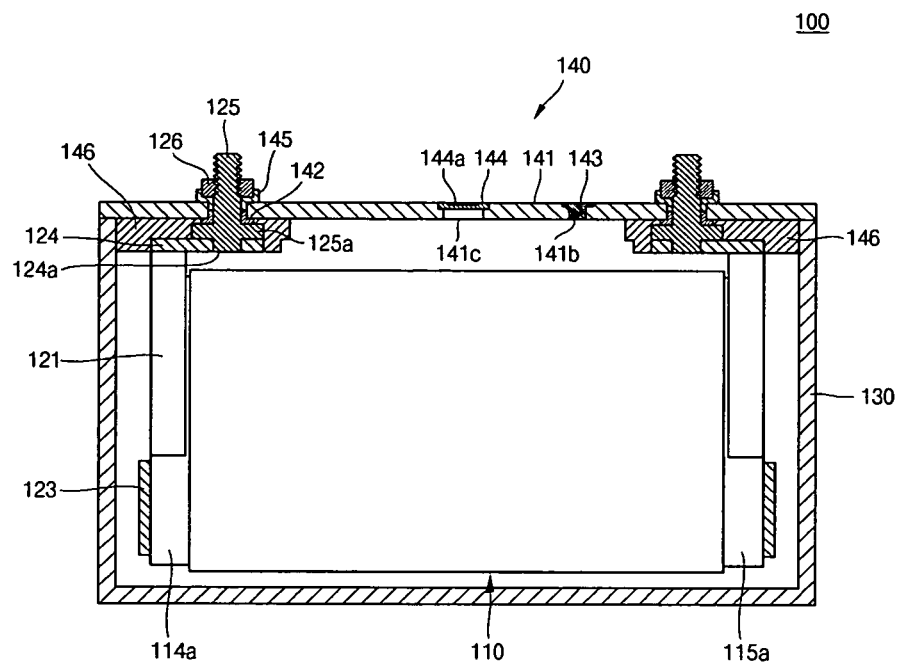
FIG. 3 illustrates a sectional view of the rechargeable battery taken along line I-I' of FIG. 1.
Figure 4:
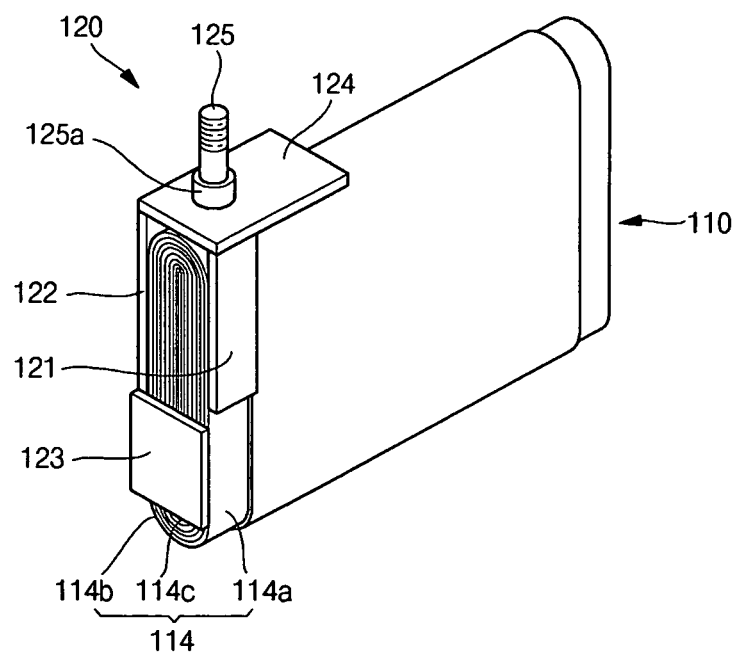
FIG. 4 illustrates a perspective view of the rechargeable battery of FIG. 1 in which an electrode assembly and a collector are coupled to each other.

FIG. 1 illustrates a perspective view of a rechargeable battery according to an embodiment. FIG. 2 illustrates an exploded perspective view of the rechargeable battery of FIG. 1. FIG. 3 illustrates a sectional view of the rechargeable battery taken along line I-I' of FIG. 1. FIG. 4 illustrates a perspective view of the rechargeable battery of FIG. 1 in which an electrode assembly and a collector are coupled to each other.

Referring to FIGS. 1 to 4, a rechargeable battery 100 according to an embodiment may include an electrode assembly 110, a collector 120, a case 130, and a cap assembly 140.

A thin plate- or film-shaped stacked body of a first electrode plate 111, a separator 113, and a second electrode plate 112 may be wound or overlapped to form the electrode assembly 110. In an implementation, the first electrode plate 111 may serve as a negative plate and the second electrode plate 112 may serve as a positive plate, but the embodiments are not limited thereto.

A first electrode active material, e.g., a transition metal oxide, may be coated on a first electrode collector (formed of a metal foil, e.g., aluminum) to prepare the first electrode plate 111. The first electrode plate 111 may include a first electrode non-coating portion 114 on which a first active material is not coated. The first electrode non-coating portion 114 may serve as a passage for current flow between the first electrode plate 111 and an outside of the first electrode plate 111. The first electrode non-coating portion 114 may be disposed on one end of the electrode assembly 110.

A second electrode active material, e.g., graphite or carbon, may be coated on a second electrode collector (formed of a metal foil, e.g., nickel or copper) to prepare the second electrode plate 112. The second electrode plate 112 may include a second electrode non-coating portion 115 on which a second active material is not coated. The second electrode non-coating portion 115 may serve as a passage for current flow between the second electrode plate 112 and an outside of the second electrode plate 112. The second electrode non-coating portion 115 may be disposed on another end of the electrode assembly 110, e.g., opposite to the first electrode non-coating portion 114.

The separator 113 may be disposed between the first electrode plate 111 and the second electrode plate 112 to prevent the first and second electrode plates 111 and 112 from being electrically short-circuited with each other and to facilitate movement of lithium ions between the first and second electrode plates 111 and 112. The separator 113 may be formed of, e.g., polyethylene, polypropylene, or a combination thereof.

The collector 120 may be electrically connected to the electrode assembly 110. The collector 120 may be electrically connected to the first electrode non-coating portion 114 and the second electrode non-coating portion 115 of the electrode assembly 110 to electrically connect the electrodes outside of the rechargeable battery 100. In an implementation, the collector 120 electrically connected to the first electrode non-coating portion 114 may be the same as the collector 120 electrically connected to the second electrode non-coating portion 115. Thus, only the collector 120 electrically connected to the first electrode non-coating portion 114 will be described below.

The collector 120 may include a pair of collector tabs 121 and 122, protrusion 123, a collector plate 124, an electrode terminal 125, and a terminal nut 126.

The pair of collector tabs 121 and 122 may be welded to a front surface 114a and a rear surface 114b of the first non-coating portion 114, respectively. The collector tab welded to the front surface 114a of the first non-coating portion 114 may be referred to as a front collector tab 121; and the collector tab welded to the rear surface 114b of the first non-coating portion 114 may be referred to as a rear collector tab 122. Thus, in an implementation, the pair of collector tabs 121 and 122 may include the front collector tab 121 and the rear collector tab 122. The front collector tab 121 and the rear collector tab 122 may have lengths different from each other. The protrusion 123 may be disposed on the relatively longer collector tab of the front collector tab 121 and the rear collector tab 122. In the present embodiment, a structure in which the front collector tab 121 has a length less than that of the rear collector tab 122 will be described as an example.

The front collector tab 121 may be welded to the front surface 114a of the first non-coating portion 114 and may have a length less than that of the rear collector tab 122. The rear collector tab 122 may be spaced from the front collector tab 121 and may be welded to the rear surface 114b of the first non-coating portion 114. In an implementation, the protrusion 123 may be on the rear collector tab 122.

The protrusion 123 may be on one end of the rear collector tab 122 and may protrude in a direction perpendicular to that of the rear collector tab 122. For example, the protrusion 123 may be connected to the rear collector tab 122 and may protrude, e.g., from a side end of the rear collector tab 122, toward the front collector tab 121. Also, the protrusion 123 may contact a side surface 114c of the first non-coating portion 114. Thus, the protrusion 123 may prevent the collector 120 from being separated from the electrode assembly 110 and moved away from the electrode assembly 110 in the event of vibration and/or impact. In an implementation, the protrusion 123 may have a length equal to or less than a thickness or width of the first non-coating portion 114. Maintaining the length of the protrusion 123 less than the thickness or width of the first non-coating portion 114 may help prevent damage to the case 130 that may be caused by the protrusion 123.

The front collector tab 121 and the rear collector tab 122 may be reversely manufactured, e.g., may be mirror images of one another. For example, the rear collector tab 122 may have a length less than that of the front collector tab 121; and the protrusion 123 may be disposed on the front collector tab 121.

The collector plate 124 may be electrically connected to the pair of collector tabs 121 and 122 and may be coupled to a bottom surface of the cap plate 141 that will be described below. A terminal hole 124a may be defined in the collector plate 124. The electrode terminal 125 may be inserted into and coupled to the terminal hole 124a.

The electrode terminal 125 may pass through the cap plate 141 and may be electrically connected to the collector plate 124. The electrode terminal 125 may have a column shape. In an implementation, a screw thread may be disposed on an outer surface of an upper column of the electrode terminal 125 extending upwardly from the cap plate 141; and a flange 125 may be disposed on a lower column of the electrode terminal 125 under the cap plate 141 to prevent the electrode terminal 125 from separating from the cap plate 141. A portion of the column at a lower potion of the flange 125a may be inserted into the terminal hole 124a of the collector plate 124.

The terminal nut 126 may be coupled to the electrode terminal 125. A screw thread may be disposed inside the terminal nut 126. The screw thread on the terminal nut 126 may be coupled to the screw thread on the electrode terminal 125 to fix the electrode terminal 125 to the cap plate 141.

The case 130 may be formed of a conductive metal, e.g., aluminum, an aluminum alloy, or nickel-plated steel. The case 130 may have an approximately hexagonal or hexahedral shape having an opening in which the electrode assembly 110 and the collector 120 are inserted and seated. An inner surface of the case 130 may be insulation-treated. Thus, the case 130 may be insulated from the electrode assembly 110, the collector 120, and the cap assembly 140. In an implementation, the case 130 may serve as one pole, e.g., a positive electrode.

The cap assembly 140 may be coupled to the case 130. In an implementation, the cap assembly 140 may include the cap plate 141, a gasket 142, a tap 143, a vent plate 144, an upper insulating member 145, and a lower insulating member 146.

The cap plate 141 may seal the opening of the case 140. The cap plate 141 may be formed of the same material as that of the case 140. In an implementation, the cap plate 141 may have the same polarity as that of the case 140. A through hole 141a through which the electrode terminal 125 passes may be defined in the cap plate 141.

The gasket 142 may be formed of an insulating material and may be disposed between the electrode terminal 125 and the cap plate 141 to seal a space between the electrode terminal 125 and the cap plate 141. The gasket 142 may prevent external moisture from penetrating into the rechargeable battery 100 and/or may prevent an electrolyte in the rechargeable battery 100 from leaking out.

The tab 143 may seal an electrolyte injection hole 141a of the cap plate 151. The vent plate 144 may be disposed on a vent hole 141c of the cap plate 141. Also, the vent plate 144 may include a notch 144a for opening the vent hole 141c at a preset pressure.

The upper insulating member 145 may be disposed between the electrode terminal 125 and the cap plate 141 and may be closely attached to the cap plate 141 and the gasket 142. The upper insulating member 145 may insulate the electrode terminal 125 from the cap plate 141.

The lower insulating member 146 may be disposed between the collector plate 124 and the cap plate 141 to prevent the collector plate and the cap plate 141 from being unnecessarily short-circuited to each other. A through hole 146a through which the electrode terminal 125 passes may be defined in the lower insulating member 146.

As described above, in the rechargeable battery 100 according to an embodiment, the protrusion 123 may be disposed on the collector 120 to prevent the collector 120 from being moved by vibration and/or impacts. Thus, the durability of the rechargeable battery 100 may be improved.

A rechargeable battery according to another embodiment will be described below.

Figure 5:
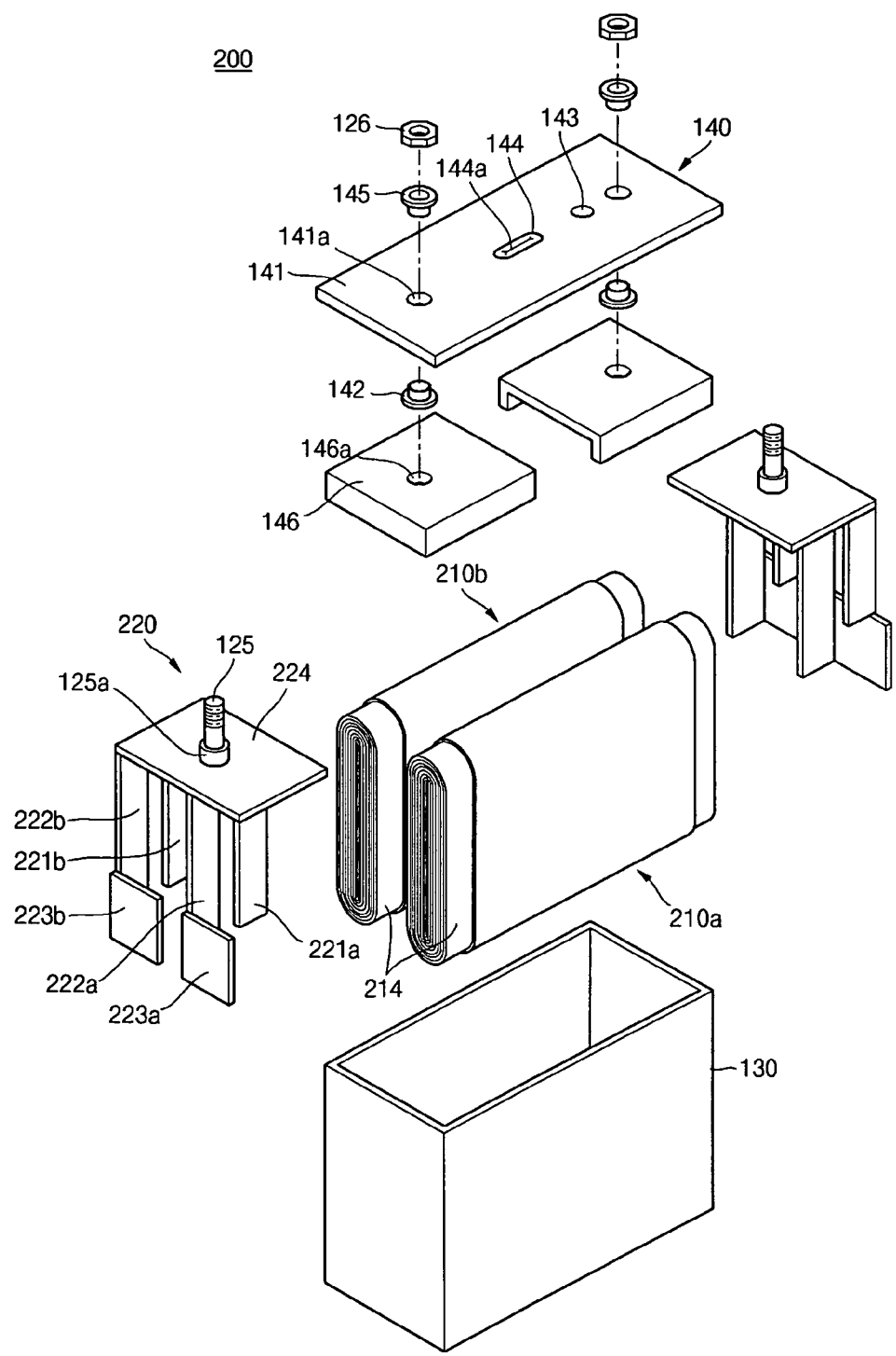
FIG. 5 illustrates an exploded perspective view of a rechargeable battery according to another embodiment.
Figure 6:
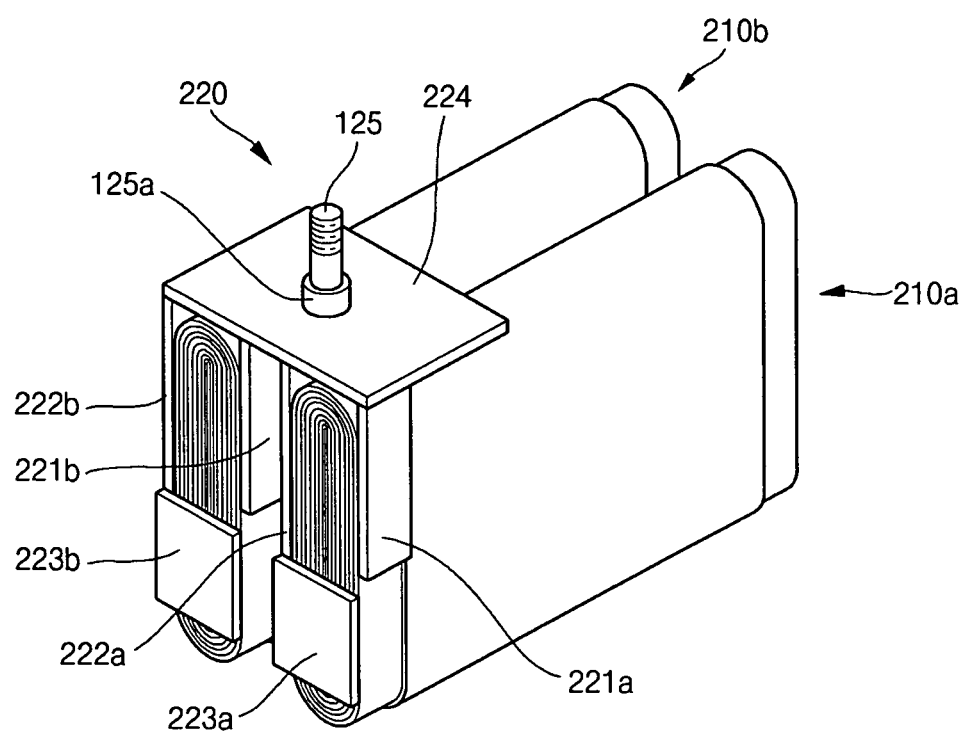
FIG. 6 illustrates a perspective view of the rechargeable battery of FIG. 5 in which an electrode assembly and a collector are coupled to each other.

FIG. 5 illustrates an exploded perspective view of a rechargeable battery according to another embodiment. FIG. 6 illustrates a perspective view of the rechargeable battery of FIG. 5, in which an electrode assembly and a collector are coupled to each other.

A rechargeable battery 200 according to the present embodiment may be similar to the rechargeable battery 100 of FIG. 2. Thus, only differences therebetween will be described below. In the description below, a rechargeable battery having two electrode assemblies and a corresponding number of collector tabs is provided as an example. However, the embodiments are not limited thereto, and the rechargeable battery may include more than two electrode assemblies and a corresponding number of collector tabs.

Referring to FIGS. 5 and 6, the rechargeable battery 200 according to the present embodiment may include, e.g., a first electrode assembly 210a, a second electrode assembly 210b, a collector 220, a case 130, and a cap assembly 140.

The first and second electrode assemblies 210a and 210b may be the same as the above-described electrode assembly 110 and repeated detailed descriptions thereof will be omitted.

The collector 220 may include a pair of first collector tabs 221a and 222a, a first protrusion 223a, a pair of second collector tabs 221b and 222b, a second protrusion 223b, a collector plate 224, an electrode terminal 125, and a terminal nut 126.

The pair of first collector tabs 221a and 222a may be coupled to the first electrode assembly 210a; and the pair of second collector tabs 221b and 222b may be coupled to the second electrode assembly 210b. Accordingly, the collector 220 may be coupled to the two electrode assemblies 210a and 210b to complete the rechargeable battery 200 according to the present embodiment. The pair of first collector tab 221a and 222a and the pair of second collector tabs 221b and 222b may be spaced from each other and electrically connected to one collector plate 224.

The pair of first collector tabs 221a and 222a may be welded to a non-coating portion 214 of the first electrode assembly 210a. The pair of first collector tabs 221a and 222a may include a first front collector tab 221a welded to a front surface of the non-coating portion 214 and a first rear collector tab 222a welded to a rear surface of the non-coating portion 214. In an implementation, the first front collector tab 221a may have a length less than that of the first rear collector tab 222a; and the first protrusion 223a may be disposed on the first rear collector tab 222a.

The first protrusion 223a may be disposed on one end of the first rear collector tab 222a and may protrude in a direction perpendicular to that of the first rear collector tab 222a. For example, the first protrusion 223a may be connected to the first rear collector tab 222a and may protrude, e.g., from a side end of the first rear collector tab 222a, toward the first front collector tab 221a. Also, the first protrusion 223a may contact a side surface of the non-coating portion 214. Thus, the first protrusion 223a may prevent the first collector 220 from being separated from the first electrode assembly 210a and moved away from the first electrode assembly 210a in the event of vibration and/or impact.

The pair of second collector tabs 221b and 222b may be welded to a non-coating portion 214 of the second electrode assembly 210a. The pair of second collector tabs 221b and 222b may include a second front collector tab 221b welded to a front surface of the non-coating portion 214 and a second rear collector tab 222b welded to a rear surface of the non-coating portion 214. The second front collector tab 221b may have a length less than that of the second rear collector tab 222b; and the second protrusion 223b may be disposed on the second rear collector tab 222b.

The second protrusion 223b may be disposed on one end of the second rear collector tab 222b and may protrude in a direction perpendicular to that of the second rear collector tab 222b. For example, the second protrusion 223b may be connected to the second rear collector tab 222b and may protrude, e.g., from a side end of the second rear collector tab 222b, toward the second front collector tab 221b. Also, the second protrusion 223b may contact a side surface of the non-coating portion 214. Thus, the second protrusion 223b may prevent the second collector 220 from being separated from the second electrode assembly 210b and moved away from the second electrode assembly 210b in the event of vibration and/or impact.

The collector plate 224 may be electrically connected to the pair of first collector tabs 221a and 222a and the pair of second collector tabs 221b and 222b and may be coupled to a bottom surface of the cap plate 141.

In the rechargeable battery according to the embodiments, the protrusion may be disposed on the collector to prevent the collector from being moved or deformed by vibration and/or impacts. Thus, the durability of the rechargeable battery may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly, the electrode assembly including a non-coating portion having a front surface, a rear surface, and a side surface;
   a case accommodating the electrode assembly;
   a cap plate sealing the case; and
   a collector electrically connected to the non-coating portion of the electrode assembly, wherein the collector includes:
   a front collector tab welded to the front surface of the non-coating portion and a rear collector tab welded to the rear surface of the non-coating portion,
   a collector plate electrically connected to the collector tabs, the collector plate being coupled with a bottom surface of the cap plate, and
   a protrusion protruding perpendicularly from one of the front collector tab or rear collector tab.

2. The rechargeable battery as claimed in claim 1, wherein the front collector tab has a first length, the rear collector tab has a second length, and the first length is different from the second length.

3. The rechargeable battery as claimed in claim 2, wherein:
   one of the first length and the second length is greater than the other, and
   the protrusion protrudes from the collector tab with a greater length.

4. The rechargeable battery as claimed in claim 1, wherein the protrusion contacts the side surface of the electrode assembly.

5. The rechargeable battery as claimed in claim 1, wherein the protrusion has a length equal to or less than a thickness of the non-coating portion.

6. The rechargeable battery as claimed in claim 1, wherein the collector further includes an electrode terminal, the electrode terminal being coupled to the collector plate.

7. The rechargeable battery as claimed in claim 1, further comprising:
   a second electrode assembly, the second electrode assembly including a non-coating portion having a front surface, a rear surface, and a side surface; and
   a pair of second collector tabs respectively welded to the front surface and the rear surface of the non-coating portion of the second electrode assembly,
   wherein a second protrusion protruding perpendicularly to each of the second collector tabs is on one of the pair of second collector tabs.

8. The rechargeable battery as claimed in claim 7, wherein the pair of second collector tabs is electrically connected to the collector plate.

* * * * *